United States Patent [19]

Beck et al.

[11] 4,406,699
[45] Sep. 27, 1983

[54] HIGH-TEMPERATURE ELECTRICALLY CONDUCTIVE CERAMIC COMPOSITE AND METHOD FOR MAKING SAME

[75] Inventors: David E. Beck, Knoxville; Jack G. Gooch, Seymour; Cressie E. Holcombe, Jr.; David R. Masters, both of Knoxville, all of Tenn.

[73] Assignee: The United States of America as represented by the U.S. Department of Energy, Washington, D.C.

[21] Appl. No.: 271,889

[22] Filed: Jun. 9, 1981

[51] Int. Cl.³ .................. C22C 30/00; C04B 35/48
[52] U.S. Cl. ........................ 75/233; 75/232; 75/234; 75/235; 501/103; 501/104
[58] Field of Search ............ 75/232, 234, 235, 233; 106/57; 501/103, 104

[56] References Cited

U.S. PATENT DOCUMENTS 3,519,405  7/1970  Gordon .................. 75/234

FOREIGN PATENT DOCUMENTS 1079975  8/1967  United Kingdom ........... 75/235

OTHER PUBLICATIONS

Ryshkewitch, Eugene; *Oxide Ceramics*, 1960, 356–369.

*Primary Examiner*—Brooks H. Hunt
*Assistant Examiner*—Joel P. Okamoto
*Attorney, Agent, or Firm*—Earl L. Larcher; Stephen D. Hamel; Richard G. Besha

[57] ABSTRACT

The present invention relates to a metal-oxide ceramic composition useful in induction heating applications for treating uranium and uranium alloys. The ceramic composition is electrically conductive at room temperature and is nonreactive with molten uranium. The composition is prepared from a particulate admixture of 20 to 50 vol. % niobium and zirconium oxide which may be stabilized with an addition of a further oxide such as magnesium oxide, calcium oxide, or yttria. The composition is prepared by blending the powders, pressing or casting the blend into the desired product configuration, and then sintering the casting or compact in an inert atmosphere. In the casting operation, calcium aluminate is preferably added to the admixture in place of a like quantity of zirconia for providing a cement to help maintain the integrity of the sintered product.

4 Claims, No Drawings

HIGH-TEMPERATURE ELECTRICALLY CONDUCTIVE CERAMIC COMPOSITE AND METHOD FOR MAKING SAME

The present invention relates generally to the fabrication of electrically conducting ceramic compositions useful at high temperatures and, more particularly, to such a composition for utilization in uranium metallurgy especially in such applications involving molten uranium and uranium alloys. This invention was made as a result of a contract with the U.S. Department of Energy.

In uranium technology the alloying of uranium as well as the recovery of scrap material is most frequently achieved in induction-heated furnaces. In induction furnaces the induction rings, commonly referred to as susceptors, must necessarily be formed of a material which is electrically conductive at room temperature to initiate induction heating. Graphite is the material most commonly used for the fabrication of susceptors due to its electrically conducting properties as well as stability at the high temperatures above about 1450° C. required for the melting of uranium and uranium alloys. One of the problems associated with using graphite susceptors and crucibles for melting uranium is that the carbon pickup from the graphite can cause deleterious contamination of the uranium when the uranium is in a molten phase. This carbon pickup has been minimized to a considerable extent by coating the susceptors and crucibles with a protective nonconductive coating such as zirconia or an yttria paint as disclosed in assignee's U.S. Pat. No. 4,002,784 which issued Jan. 11, 1977. While these nonconductive refractory coatings significantly reduced the carbon contamination of the uranium, it was felt that the presence of any cracks or pores through the protective coating would allow sufficient contact between the uranium and the graphite to contaminate the molten uranium or uranium alloy with carbon. Another approach to forming susceptors for induction furnaces is to use silicon containing ceramics for the induction rings but even in this construction some contamination of uranium occurs due to the transferrance of silicon to the melt. The presence of carbon and silicon in the melt also prevent the formation of alloy compositions within desired control ranges since they often form alloying constituents with several of the uranium additives which tend to segregate within the cast composite and thereby introduce undesirable chemical and physical changes.

SUMMARY OF THE INVENTION

It is the objective goal or aim of the present invention to provide an electrically conductive composition for the fabrication of susceptors used for induction melting of uranium and uranium alloys and to also provide such a composition for forming crucibles and other containment vessels utilized to hold uranium at elevated temperatures. This composition does not lend to any contamination of the confined uranium since there is little apparent reaction between the compositional constituents of the susceptor or containment vessel and the confined uranium.

This objective is achieved by utilizing a sintered ceramic composition which comprises about 20–50 vol.% niobium and a nonconductive oxide selected from the group consisting of zirconium oxide, zirconium oxide plus a stabilizer therefor, a mixture of zirconium oxide and calcium aluminate, and a mixture of calcium aluminate and zirconium oxide plus a stabilizer for the zirconium oxide. This composition is characterized by being electrically conductive at room temperature and having properties which are essentially nonreactive with molten uranium.

The stabilizer utilized for the zirconium oxide is selected from a group of oxides consisting of calcium oxide, magnesium oxide, and yttria, with the stabilizer being of sufficient concentration to retain the zirconium oxide in a cubic phase for inhibiting the nonuniform expansion of zirconium oxide as a function of temperature.

Other and further objects of the invention will be obvious upon an understanding of the illustrative compositions and method about to be described or will be indicated in the appended claims, and various advantages not referred to herein will occur to one skilled in the art upon employment of the invention in practice.

DETAILED DESCRIPTION OF THE INVENTION

As briefly described above, the present invention is directed to a metal-oxide ceramic composition which is characterized by being electrically conductive at room temperature for facilitating its use as a susceptor in an induction furnace. This composition is essentially nonreactive with molten uranium and uranium alloys at temperatures greater than 1450° C. for providing applications of the composition in the fabrication of crucibles and other containment vessels utilized to contain uranium metal and uranium alloys, especially in molten phases thereof. The ceramic composition of the present invention is formed of a particulate mixture of 20–50 vol.% niobium metal with zirconium oxide. Preferably, the zirconium oxide, which was selected as the oxide component because of its economics, low reactivity with molten uranium and its electrical conductivity above 1000° C., is stabilized with calcium oxide, magnesia, or yttria at a level sufficient to retain the zirconium oxide in cubic phase. The powder or particulate mixture is blended together and either cast or pressed into the desired configuration and then sintered to provide an integral structure as will be described in detail below. In casting operations, calcium aluminate is preferably added to provide cement for increasing the structural integrity of the casting.

Niobium was selected from several refractory metals including tungsten, and tantalum since it by far provided the strongest product. A niobium concentration of 20–50 vol.% provided composites of sufficient structural integrity for most applications. However, the preferred range for the niobium is about 20 to 35 vol.% since concentrations of niobium greater than about 35 vol.% reduce the density and the overall strength of the product. On the other hand, composites formed with less than about 20 vol.% niobium did not possess adequate structural integrity nor were they electrically conductive at room temperature as required to be useful in applications as induction susceptors and the like. The particulate size of the niobium metal used in the fabrication of various composites is preferably less than about 200 mesh.

With a little as 20 vol.% niobium in the composite it was unexpected that the latter would be electrically conductive at or near room temperature. In fact, a composition containing less than about 50 vol.% niobium would not be expected to have a continuous phase of niobium which is a condition thought to be necessary for providing sufficient conductivity to initiate inductive heating. While the particular mechanism for providing electrical conductivity through such composites is not clear, it is suggested that the reason for this conductivity may be due to the formation of a substoichiometric zirconia, niobium zirconate, or niobium suboxides such as $NbO_2$ at the zirconia-niobium grain-to-grain interfaces.

Since niobium possess poor high-temperature creep properties, relatively large grain zirconium oxide particulates in a size range of about −14 to +100 mesh were used in the fabrication of the composites. Pure zirconium oxide possesses nonuniform expansion as a function of temperature. To eliminate or substantially minimize this nonuniform expansion of zirconium oxide, the latter is stabilized by the substitution of a stabilizing oxide for a portion of the zirconium oxide. This will be illustrated with reference to wt.%; thus, it is noted that a range of 20 to 50 vol.% niobium in a niobium/zirconium oxide composition contains approximately 27 to 60 wt.% niobium. In the present invention calcium oxide, magnesium oxide, or yttria may be utilized to stabilize the zirconia. With about 4 wt.% calcium oxide substituted for a like amount of zirconia, the zirconia becomes partially stabilized while approximately 5 wt.% of calcium oxide results in fully stabilized zirconia which eliminates the nonuniform expansion. Concentrations of magnesium oxide ranging from about 4 to 15 wt.% provide partially stabilized to fully stabilized zirconia. Yttria additions of about 8 to 15 wt.% provide the partially stabilized to fully stabilized zirconia forms. Greater quantities of yttria may be used in place of zirconia, but such greater quantities of yttria would significantly increase the cost of the composite while not sufficiently increasing the resistance of the composite to molten uranium to warrant the addition of the extra yttria. Also, lanthanide-series oxides may be used for stabilizing the zirconia, with levels at the same wt.% as the yttria levels. The incorporation of these stabilizing oxides in the composition is typically achieved by mixing particles thereof in a size of about −325 mesh or −44 micrometers in the initial blend of zirconia plus stabilizer, followed by calcining at 1500° C. or higher; or the admixture with niobium may be sintered with the zirconia stabilization occurring in that step. As pointed out above, the yttria, magnesium oxide, and calcium oxide is substituted for a like quantity of the zirconium oxide in the admixture. Prestabilized zirconia powder is commercially available as a solid solution of zirconia plus the stabilizer.

In the fabrication of the compacts, a dry pressing operation may be utilized by applying a unidirectional pressure of about 5000 to 10,000 psi on the blend of particulates. The resulting compacts may then be sintered at a temperature in the range of about 1650° to 1700° C. in an argon, vacuum, or other inert atmosphere for duration of about 15 to 120 minutes to provide an integral structure.

Instead of this pressing operation, the ceramic compositions may be formed in the desired structural configuration by using a casting procedure. In casting, the powder mixture is blended in a rubber mold, formed in the desired configuration and then sintered to at least 75% of the theoretical density of the particulate mass at a temperature of about 1650° to 1700° C. in an inert atmosphere of argon or the like for a duration of about 30 to 120 minutes (typically 1 hour).

The ceramic composites, whether cast or pressed, are sufficiently strong, and electrically conductive so as to be useful in forming susceptors or crucibles to be utilized in a vacuum induction furnace at temperatures in excess of about 1400° C.

In the casting operation, it is preferable to substitute calcium aluminate for about one-fourth to one-half (by weight) of the zirconia; or the weight ratio of zirconia to calcium aluminate is in the range of 3.0 to 1.0. This provides a cement for facilitating the casting operation. Therefore, a castable composition typically contains 15 to 25 wt.% of commercial-grade calcium aluminate (normally in the mole ratio 1:2.5 $C_aO:Al_2O_3$). This calcium aluminate may be added to the admixture in a particulate form in the size range of about −325 mesh or −44 micrometers. Without the calcium aluminate addition the temperatures which the cast article may be satisfactorily subjected to may be in excess of about 2000° C. but with the calcium aluminate addition the maximum temperature is about 1800° C.

With the articles formed by pressing or casting as described above, the subject ceramic composition is particularly suitable for use in the induction of melting uranium and the like at temperatures greater than 1400° C. If desired, yttria or zirconium oxide coatings may be applied to the surface of the crucibles or susceptors to provide further protection to inhibit the interaction between the uranium and the composite. However, it has been found that only minimal interaction will occur between the molten uranium and a crucible of the ceramic composition of the present invention even if the protective coating fails. An additional benefit derived from the present invention is that the crucible material may be recycled for fabrication into other or the same articles if desired.

We claim:

1. A sintered ceramic susceptor consisting essentially of about 20 to 50 vol.% niobium and an oxide selected from the group consisting of zirconium oxide, zirconium oxide plus a stabilizer therefor, a mixture of zirconium oxide and calcium aluminate, and a mixture of calcium aluminate and zirconium oxide plus the stabilizer therefor, the stabilizer for the zirconium oxide being selected from the group of oxides consisting of calcium oxide in a concentration of about 4–5 wt.% of the zirconium oxide content, magnesium oxide in a concentration of about 4–5 wt.% of the zirconium oxide content and yttria in a concentration of about 8–15 wt.% of the zirconium oxide content, each stabilizer being of a concentration sufficient to retain the zirconium oxide in a cubic phase for inhibiting the nonuniform expansion of the zirconium oxide as a function of temperature, said susceptor being characterized by being electrically conductive at room temperature for initiating induction heating and by being essentially nonreactive with molten uranium.

2. A sintered ceramic susceptor as claimed in claim 1, wherein the niobium is present in a concentration of about 20 to about 35 vol.%.

3. A sintered ceramic composition comprising about 20 to 50 wt.% niobium and an oxide selected from the group consisting of a mixture of zirconium oxide and calcium aluminate and the mixture of calcium aluminate and zirconium oxide plus a stabilizer therefor with the calcium aluminate being in a concentration of about 15 to 25 wt.% of the composition, said composition being characterized by being electrically conductive at room temperature and by being essentially nonreactive with molten uranium.

4. The composition claimed in claim 3, wherein the ratio of zirconia to calcium aluminate by weight is in the range of about 3.0 to 1.0.

* * * * *